UNITED STATES PATENT OFFICE.

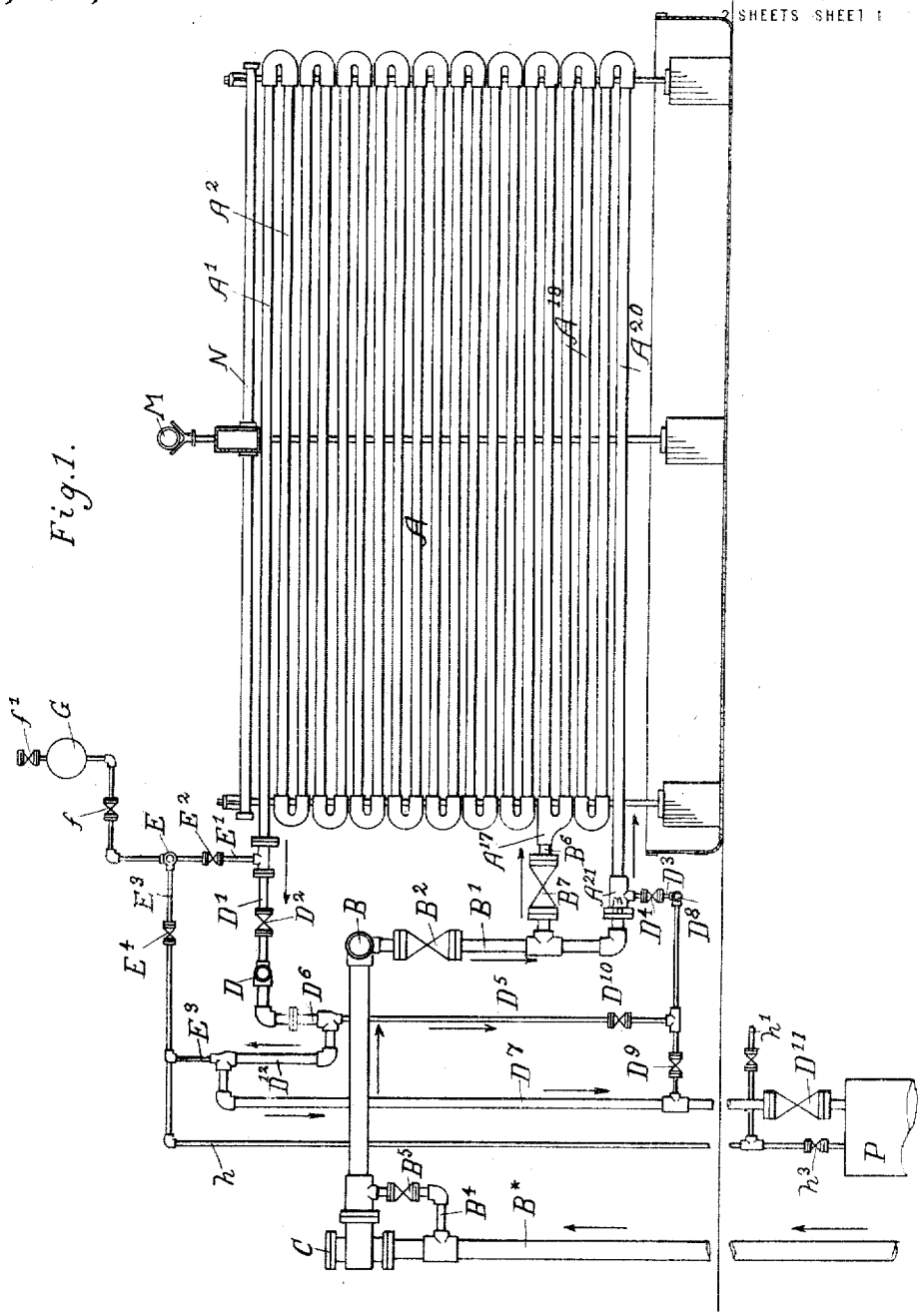

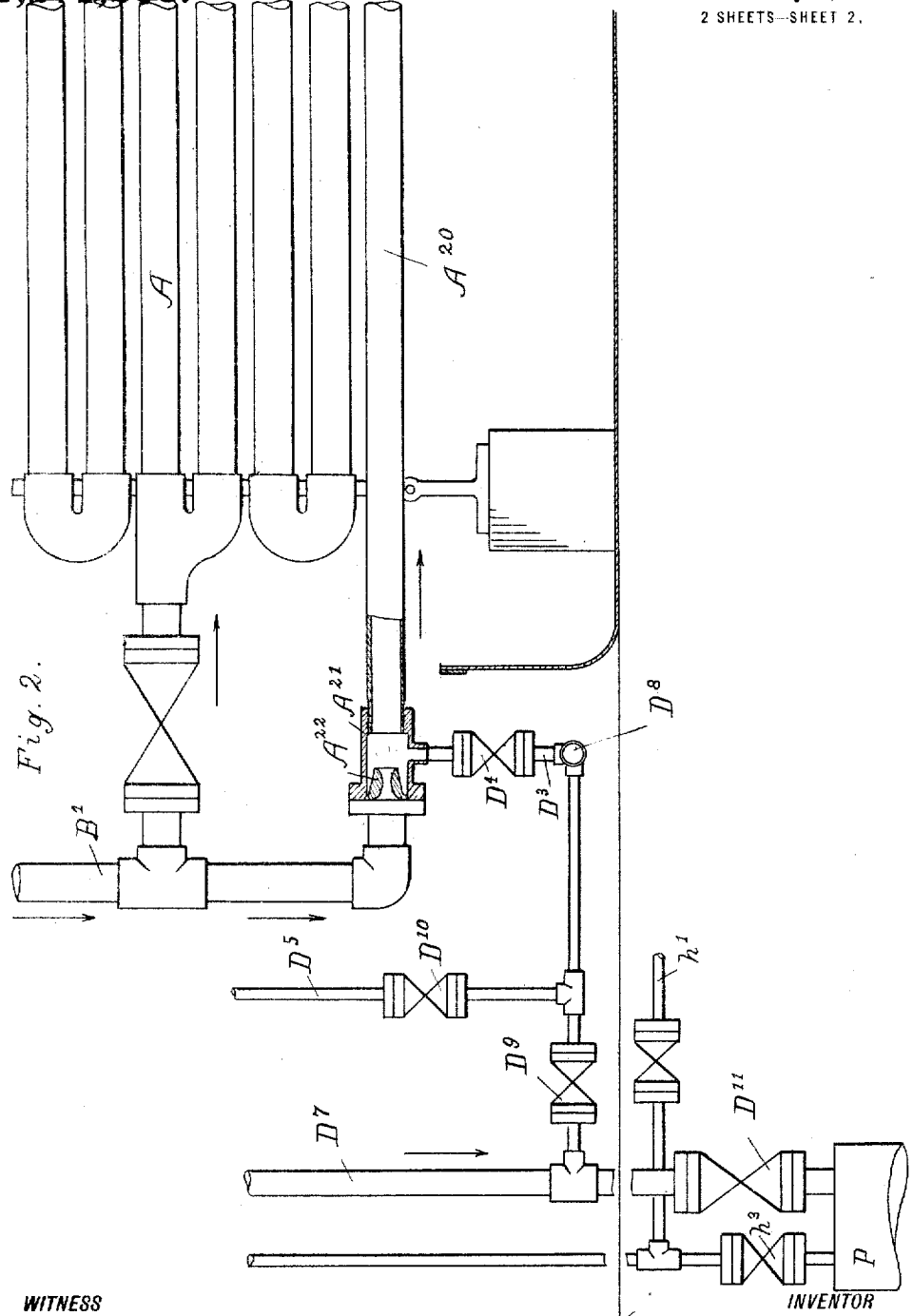

LOUIS BLOCK, OF MAMARONECK, NEW YORK.

CONDENSER.

1,271,268.   Specification of Letters Patent.   Patented July 2, 1918.

Application filed May 20, 1915. Serial No. 29,276.

*To all whom it may concern:*

Be it known that I, LOUIS BLOCK, a citizen of the United States, and resident of the town of Mamaroneck, county of Westchester, State of New York, have invented certain new and useful Improvements in Condensers, of which the following is a specification.

My invention relates to that type of condensers employed for reducing to a liquid form ammonia gas which is employed as a cooling agent.

The operation of the condensers of this type is generally well understood by those versed in the art and yet I will briefly outline this operation so that the importance of my invention may be most readily appreciated.

The gaseous ammonia is received in the condenser at a high temperature and under a pressure of probably about 12 atmospheres, it is cooled and condensed and the resultant liquid is cooled so that it may be employed as a means for removing heat from other bodies or masses the temperature of which it is desired to reduce.

The object of my invention is to effect a more rapid condensation of ammonia or other gases than has been accomplished heretofore and to effect this condensation with less cooling and condensing surface; I therefore use the principle known as counter current heat exchanging in my apparatus and although the advantages derived therefrom are numerous and important they do not comprise all of the advantages to be found in my invention.

My apparatus attains a counter current heat exchanging and the advantages to be derived therefrom by virtue of its construction and operation and particularly by virtue of the fact that the hot gas enters at or near the bottom of the condenser giving up or imparting its super-heat to the cooling water which is about to leave the condenser.

The condenser of my construction consists of a series of what is commonly called zig-zag or trombone coils of pipes in vertical alinement, and as the gas passes upward through the several pipes of the coil it is met by water flowing downward over the outer surfaces of the pipes. In the drawings I have for convenience shown only one coil as the number of coils employed will be controlled by the desired size of the condenser; I may, however, refer to my condenser as though comprised of a plurality of coils. The water is showered over the coil, the coldest water first upon the uppermost pipe of the coil, then on the second and so on down upon the exterior of each successive pipe. On its downward passage it will become more and more warmed, it is evident therefore that the superheat of the gas is delivered to the warmest cooling water, water which may be too warm for effective condensing and yet which has not had its temperature raised to a point too high to allow it to become effective in removing the superheat.

I provide means for introducing with the hot gas, certain portions of the previously liquefied gas, and I provide means whereby the entering liquid and the hot gas may be thoroughly mixed. I have found that the presence of liquid ammonia in the condenser and the introduction thereof at or near the point of entrance of the hot gas, adds materially to the efficiency of the condenser.

A further improvement of importance is the means that I have provided for assuring that the gas shall enter the condenser at a velocity sufficiently high to obtain the best results, this means is a nozzle which will be later described and which I arrange in the entrance passage, the nozzle may be considered an injector nozzle as by it, and through it I inject the gas into the condenser at a velocity sufficiently high to carry it upward in the condenser, and to carry the produced liquid beyond the point where condensation is completed.

These injecting nozzles are well adapted to accomplish another purpose of no little importance. Where in large condensers a plurality of units such as the one here shown are employed, the nozzles, or the relative opening therethrough may be proportioned that each unit will obtain a proper proportional quantity of hot gas, this use of the nozzles assures a uniform operation of all of the units of the condenser and obviates the necessity for providing regulating valves for controlling the volume of gas entering each unit, while valves, the position of which may be inadvertently or accidentally changed resulting in a mal-adjustment, may cause an uneven distribution and a loss in operative efficiency.

I may arrange a nozzle in each of the entrance passages to the condenser, that is in each passage through which gas is admitted and in each passage through which liquid is admitted.

Other advantages of my construction are contained in the arrangement which provides for the delivery of the gas from a high point into the bottom of the condenser forming a trap which prevents the backward movement of the liquefied ammonia through the introduction passage. I also provide a trap in the liquid discharge passage which prevents the discharge from the condenser of any uncondensed gas.

The construction which makes these advantages possible as well as the operation of my device will be fully set forth as the specification progresses.

The following is what I consider the best means of carrying out this invention.

The accompanying drawings form a part of this specification, in which:

Figure 1 shows a side elevation of a condenser consisting of a single unit or series of vertically arranged pipes connected at their ends by return bends.

Fig. 2 shows certain parts removed. This figure is on a larger scale and a portion is in section, to disclose the arrangement of the nozzles.

Similar reference characters indicate like parts in all of the figures where they appear.

The condenser proper consists of a series of approximately parallel and practically horizontal pipes one above the other and of about equal lengths. The ends of the pipes are connected by return bends, and in such a manner that the entire series of pipes and return bends produce a continuous coil. I have arranged my coil vertical, that is one pipe above another and the condenser shown will be found to consist of twenty pipes, the number of pipes used, however, in my condenser will be determined by the work to be done by the condenser, and I do not therefore desire to be limited in the number, size or length of the pipes employed.

It will be noted that the lowermost pipe $A^{20}$ is connected to a vertical pipe $B^4$, which is in turn connected to a distributing header B.

Hot gas from a compressor not shown is forced upward in the direction of the arrows through the pipe $B^3$, and passing through the check valve C enters the distributing header B thence it passes through the valve $B^2$, through the pipe $B^1$ into the pipe $A^{20}$ the lowermost pipe of the condenser. The hot gas passes upward through the several approximately horizontal pipes of the condenser and as a liberal quantity of cool water is showered over the condenser, by means of the delivery pipe M and distributing pipe or trough N, the hot gas in the condenser will be first cooled then condensed, the first effect is the delivery of the super-heat to the warmest water, this probably occurs in the first two lowermost pipes of the condenser, the gas is then further cooled, and condensation will probably commence at about the pipe indicated at $A^{18}$. It is advisable in some instances to introduce additional quantities of gas, and I accomplish this by providing a return bend as indicated at $A^{17}$, having an inlet opening to which a nipple $B^6$ and valve $B^7$ are connected, which members are in turn, and by means of a T, connected to the pipe $B^1$, these parts constituting a branch pipe for admitting additional gas to the coil.

The liquefied gas and the hot incoming gas intimately mingle within the condenser forming therein an agitated mixture of gas and liquid which continues upward until the cooling influence upon the exterior of the pipes condenses all of the gas. I prefer that this complete condensation should be finished at a point lower than the uppermost pipe of the condenser so that the liquid produced in the condenser may be more effectively cooled and reduced to a lower temperature than would be possible were the liquid to be discharged as rapidly as it is formed. This then suggests one of the most important features of my invention, the fact that I retain certain portions of condensed liquid in my condenser at all times, thereby effecting a more rapid and complete exchange of heat, as it is now an established fact that the transfer of heat from liquid to liquid may be accomplished more efficiently and economically than can the transfer of heat from gas to liquid.

The discharge of the liquid from the condenser is effected through the pipe $D^4$, valve $D^2$, pipe $D^6$ and through the trap formed by $D^8$ and the pipe $D^{12}$, and then downward through $D^7$ to the receiving chamber or tank P.

$E^2$ is a siphon breaker which connects the top of the trap with the equalizing header E, and insures a regular and constant liquid flow through the trap.

At the lower end of the pipe $D^7$ I have arranged a T, and to this T I secure a pipe $D^5$ provided with a valve $D^{10}$, pipe $D^5$ terminates in a connection with a horizontal pipe entering a header $D^6$, which is in turn connected by a short length of pipe $D^3$ and valve $D^9$ with the lowermost pipe $A^{20}$ of the condenser. The connection of the pipe $D^3$, with the pipe $A^{20}$ may be by means of a special fitting which is in effect a T flanged at one end, such a fitting as indicated at $A^{21}$.

Within the fitting $A^{21}$, and secured adjacent to the flanged end thereof, I arrange an injector nozzle as indicated at $A^{22}$, this nozzle has a double function as here arranged, first, it increases the velocity of the entering gas by reason of its contracted port of passage. It will be noted that the connection for the entrance of the liquid is in front of the nozzle $A^{22}$, and that the gas injected by the nozzle $A^{22}$ must pass over the end of the pipe through which the liquid is admitted, the action of the gas passing over the liquid entrance pipe provides the second function of the nozzle, it operates similar to the well known injector, drawing the liquid through the pipe $D^5$ by reason of the velocity of the gas, breaking up the liquid into spray or small globules, and thus thoroughly mixing it with the gas in the pipes, and by acting as an injector the nozzle $A^{22}$ and fitting $A^{21}$ accelerates the movement of the liquid entering the condenser.

Throughout the entire operation of the condensing portion of my condenser I obtain an intimate mixture of gas and liquid, this mixture is promoted and encouraged by the injector which really consists of all of the parts within the fitting $A^{21}$ and the connections thereto, and from the construction it will be seen that I arrange a nozzle within the fitting $A^{21}$ adjacent to the end of the pipe $D^5$ I desire to call attention, however, to the fact that I do not extend the end of the pipe $D^5$ into the fitting $A^{21}$ for a distance sufficient to retard the passage of gas through the nozzle $A^{22}$ as from my experiments I have found that the velocity of the gas passing through the nozzle is sufficiently high to produce an effective suction within the fitting $A^{21}$, a suction that will at all times be found sufficient to induce the flow of proper quantities of liquid into the fitting $A^{21}$ and thence into the condenser.

The pipe $D^5$ connects with a horizontal pipe, one end of which terminates in the header $D^6$ and the other end of which is connected to the larger liquid delivery pipe $D^7$, which is connected through the valve $D^{11}$ with the receiving tank P. A valve $D^9$ is arranged in the horizontal pipe between the pipes $D^5$ and $D^7$ so that under normal conditions none of the liquid which passes downward through the pipe $D^5$ may enter the pipe $D^7$, when, however, it is found desirable to drain the condenser I may close the large valve $B^2$, which controls the passage of hot gas into the condenser and also close the valves $D^{10}$ and $D^2$ then by opening the valve $D^9$ the liquid contained in the condenser will flow through the valve $D^4$, header $D^6$ and valve $D^9$ to the receiver P.

I have arranged an equalizing header E which connects with all of the units by means of a pipe $E^1$ and valve $E^2$ and which is in turn connected by a pipe $E^3$, with the liquid delivery pipe and by a pipe $h$ and valve $h^3$ with the liquid receiver. During the entire operation of my condenser I have found it quite desirable that the passage through the equalizing pipes and header be open at all times, it will however be understood that when the condenser is drained the equalizing header will maintain a pressure in the drained condenser equal to the pressure in the other condensers and the receiver P. Should it be desirable to remove a section of a condenser which has been drained, it will be necessary to pump out the condenser or unit, a portion of which is to be removed, for the purpose of repair or other purpose. To accomplish this I have provided the pipe $h^1$, which is connected to the pipe $h$ and with the suction side of the compressor, I then close the valves $E^4$ and $h^3$ and valves $E^2$ on all the units not to be pumped out, and I close valves $B^2$, $D^4$ and $D^2$ on the units to be pumped out; a few strokes of the compressor will then exhaust the section to be removed, it being appreciated that the suction need not be continued sufficiently to reduce the pressure below atmospheric.

The drum G connected to the equalizing header E serves as a means for collecting from the equalizing header and from all other parts of the condenser such noncondensable gases as may be present in the condenser, and which naturally would rise to the top.

Before closing this description I desire to call attention to certain parts which I consider especially important, they are:

The means for delivering the hot gas from a high point to the bottom of the condenser preventing a back flow of liquid, a construction important in this particular type of condenser wherein it is the intention to retain liquid for the purpose of assisting in promoting condensation.

The injecting nozzle for the hot gas and the ejector formed by the fitting $A^{21}$ which not only provides means for securing a desirable rapidity of movement of the gas but also inducts liquid from the liquid supply pipe and promotes and produces an efficient and intimate co-mingling of the gas and liquid with resultant increased efficiency.

The means for injecting additional quantities of hot gas under high pressure into the condenser at a point above the lowest pipe.

The trap which prevents the accidental forward flow of liquid and insures a regular and steady discharge of liquefied gas and the siphon breaker which prevents a possible emptying of the condenser of liquid, as I find it quite necessary and exceedingly desirable that liquid be retained in the condenser at all times, this trap also prevents the discharge of uncondensed gas.

The means for returning to the gas inlet passage a portion of the condensed gas in the form of cooled liquid, there to be mingled with the incoming gas for reasons described.

The means for equalizing the pressure in any number of units, means for draining the condenser in part or in whole, and the means for reducing the pressure in any of the units when desired, and although it is not my intention to forfeit my rights to any of the parts of this invention to which I may be entitled, I deem the features above enumerated as worthy of special mention.

Modification may be made within the scope of the appended claims without departing from the principle or sacrificing the advantages of this invention.

I may arrange an injecting nozzle between the valve B⁷ and the nipple B⁶.

Having carefully and fully described my invention what I claim and desire to secure by Letters Patent is:—

1. The combination in a condenser of a coil; a main gas inlet pipe communicating therewith, a connection to a source of liquid for delivering the same into the gas in the coil to form a mixture therewith; a means for injecting gas connected to a source of gas and to said coil; and a condenser liquid discharge pipe leading from said coil.

2. A condenser comprising a coil; a gas inlet pipe and a liquid inlet pipe communicating therewith; an agitating nozzle arranged with its delivery passage in position to direct gas into the coil at an angle to the liquid inlet, and a condensed liquid discharge pipe for the said coil.

3. The combination in a condenser of a coil; a gas conveying pipe communicating with the inlet thereof, a pipe connected to a source of liquid for delivering the same into the gas in the coil to form a mixture therewith; a gas-injecting nozzle arranged at the inlet of said coil; and a condensed liquid discharge pipe leading from said coil.

4. A condenser comprising a coil; a main gas inlet pipe communicating therewith; a condensed liquid discharge pipe leading from the top of said coil; means connected to a source of liquid for delivering the same into the gas to form a mixture therewith; a pipe connected to a source of gas for injecting additional gas into the coil between the top and bottom thereof, in the direction of the ascending convolution.

5. The combination in a condenser of a coil; a main gas inlet pipe communicating therewith; a pipe connected to a source of liquid for delivering the same into the gas in the coil to form a mixture therewith; a gas-injecting nozzle connected to a source of gas and to said coil; and a condensed liquid discharge pipe leading from said coil.

6. A condenser comprising a coil; a main gas inlet pipe communicating therewith; a condensed liquid discharge pipe leading from said coil; a pipe connected to a source of liquid for delivering the same into the gas to form a mixture therewith; a pipe connected to a source of gas for injecting additional gas into the coil; a pipe connecting the liquid discharge pipe with the first pipe.

7. A condenser comprising a coil; a main gas inlet leading into the coil adjacent its bottom; a condensed liquid discharge pipe leading from the coil; a pipe connected to a source of liquid for delivering the same into the gas in the coil to form a mixture therewith; and a pipe connected to a source of gas for injecting additional gas into the coil in the direction of an ascending convolution thereof.

8. A condenser comprising a plurality of coils; a main gas pipe connected to each of the coils; a pipe for each coil for delivering liquid into the gas therein; branch pipes connected to the main gas pipes and to each coil between the inlet and outlet thereof, and a final liquid discharge pipe connected to each coil.

Signed at New York city, in the county and State of New York this 14th day of May, 1915.

LOUIS BLOCK.

Witnesses:
G. E. S. MARR,
ARTHUR PHELPS MARR.